United States Patent
Pfeiler

(10) Patent No.: US 7,959,056 B2
(45) Date of Patent: Jun. 14, 2011

(54) METHOD FOR JOINING RAILS BY FRICTION WELDING

(75) Inventor: Johann Pfeiler, Leoben (AT)

(73) Assignee: voestalpine Schienen GmbH, Loeben (AT)

( * ) Notice: Subject to any disclaimer, the term of this patent is extended or adjusted under 35 U.S.C. 154(b) by 1406 days.

(21) Appl. No.: 11/258,857

(22) Filed: Oct. 27, 2005

(65) Prior Publication Data

US 2006/0091186 A1 May 4, 2006

(30) Foreign Application Priority Data

Nov. 4, 2004 (AT) ................. A 1843/2004

(51) Int. Cl.
*B23K 20/12* (2006.01)
*B23K 31/02* (2006.01)

(52) U.S. Cl. .... 228/113; 228/2.1; 228/112.1; 228/114.5

(58) Field of Classification Search ........... 228/112.1, 228/113, 114.5; 156/64, 73.5
See application file for complete search history.

(56) References Cited

U.S. PATENT DOCUMENTS

| | | | | |
|---|---|---|---|---|
| 3,691,622 | A * | 9/1972 | Takagi et al. | 228/114.5 |
| 3,732,613 | A * | 5/1973 | Steigerwald | 228/112.1 |
| 5,697,545 | A | 12/1997 | Jennings et al. | |
| 2003/0075584 | A1* | 4/2003 | Sarik et al. | 228/2.1 |
| 2004/0256439 | A1 | 12/2004 | Pfeiler | |
| 2005/0224559 | A1 | 10/2005 | Pfeiler | |

FOREIGN PATENT DOCUMENTS

| | | |
|---|---|---|
| AT | 411883 | 7/2004 |
| DE | 3307445 | 9/1984 |
| DE | 19807457 | 9/1998 |
| EP | 070919 | 4/1996 |
| EP | 1459833 | 9/2004 |
| GB | 1293531 | 10/1972 |
| JP | 5-104263 | 4/1993 |
| JP | 6-312279 | 11/1994 |
| JP | 2002-153975 | 5/2002 |
| WO | 2004/028733 | 4/2004 |

OTHER PUBLICATIONS

English language Abstract of JP 5-104263.
English language Abstract of JP 2002-153975.
English language Abstract of JP 6-312279.
Emmerich & Waltraude Simoncsics, Japanese-English Code-Dictionary, ÖBV Pädagogischer Verlag GmbH, Vienna 1996, ISBN 3-215-12168-9, p. 705, right column.

* cited by examiner

*Primary Examiner* — Jessica L Ward
*Assistant Examiner* — Devang R Patel
(74) *Attorney, Agent, or Firm* — Greenblum & Bernstein, P.L.C.

(57) ABSTRACT

Method for the metallic joining of profiled rails in the longitudinal direction. Method includes heating rail ends to a joining temperature by pressing together faces of the rails end while simultaneously moving them relative to one another in an oscillating manner with a greatest oscillation amplitude relative to one another perpendicular to the main axis direction Y with the maximum moment of inertia of the cross-sectional surface, aligning the rail ends, and pressing the faces together to join the rails together.

16 Claims, 1 Drawing Sheet

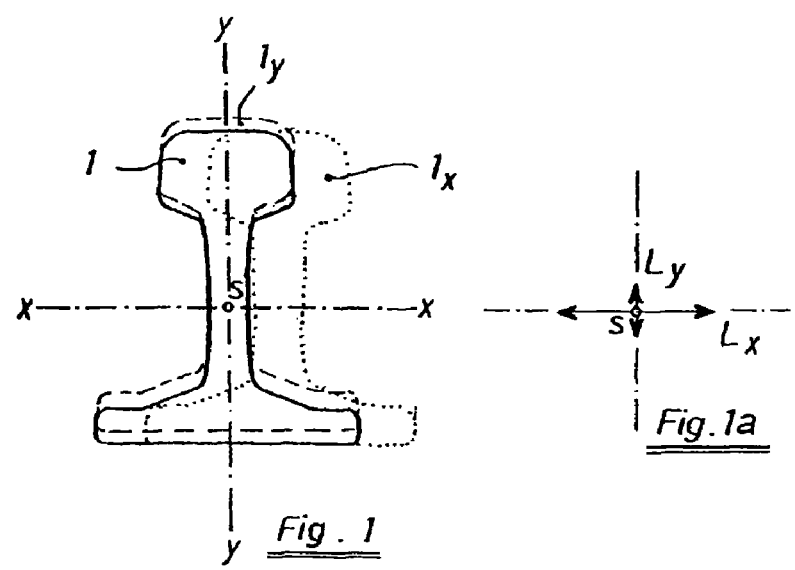
Fig. 1
Fig. 1a
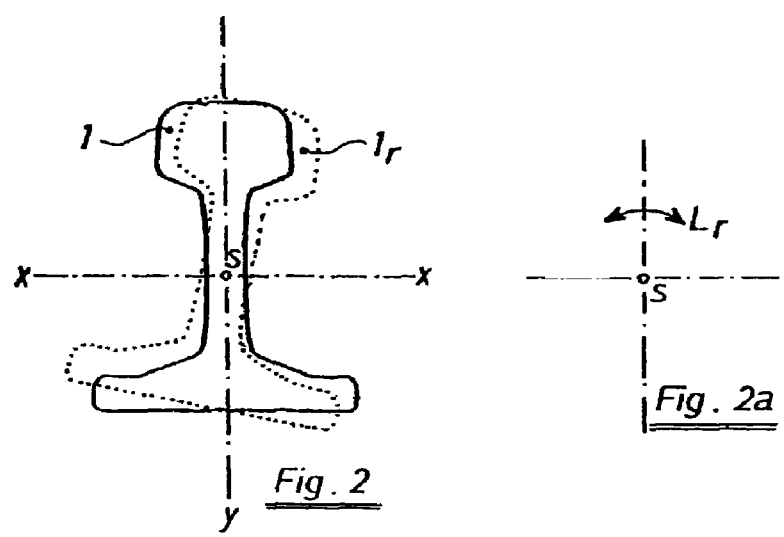
Fig. 2
Fig. 2a
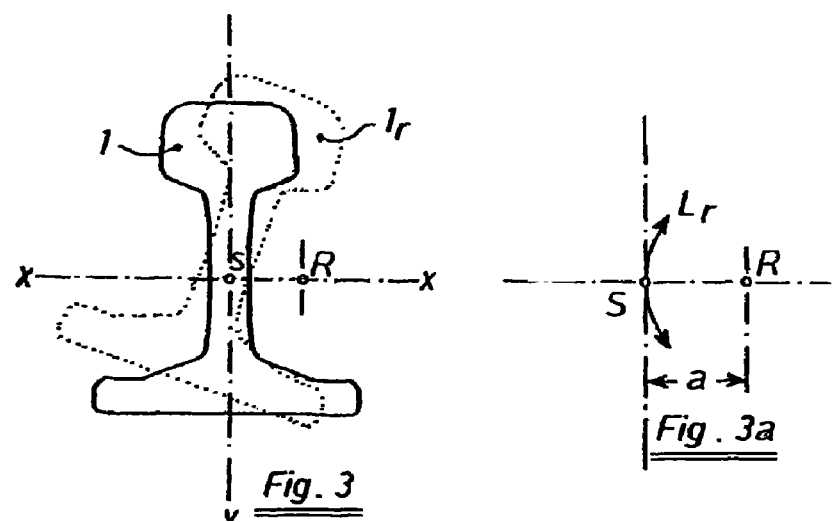
Fig. 3
Fig. 3a

METHOD FOR JOINING RAILS BY FRICTION WELDING

CROSS-REFERENCE TO RELATED APPLICATIONS

The present application claims priority under 35 U.S.C. §119 of Austrian Patent Application No. A 1843/2004, filed on Nov. 4, 2004, the disclosure of which is expressly incorporated by reference herein in its entirety.

BACKGROUND OF THE INVENTION

1. Field of the Invention

The invention relates to a method for the metallic joining of profiled rails in the longitudinal direction, e.g., railroad rails, beams or the like, by friction welding, in which, in a first step a heating of the rail ends to a joining temperature takes place by pressing together the faces while simultaneously moving them relative to one another and in a second step a joining of the rails takes place after alignment of the contours or the cross sections by pressing the faces together.

2. Discussion of Background Information

A metallic joining of the faces of rods can be advantageously accomplished by friction welding, whereby heating the faces pressed against one another or applying heat to the rod ends can be achieved by a relative movement of the same with respect to one another.

The relative movement can be achieved as a rotary motion of at least one rod at a rotational speed and/or with a direction of rotation about the common axis differing from the rod opposite, or at least one of the rod ends is moved to and from and/or in a circling or orbital manner perpendicular to the axis aligned in a different manner compared to the opposite one.

In particular for long rods with a respectively high mass, it is advantageous for heating the rod ends to be joined to move them cyclically relative to one another essentially perpendicular to the axis, i.e., not rotating.

A friction welding method and a device for the friction welding of pipes is known from U.S. Pat. No. 5,697,545. According to this document, the faces of two pipe parts are placed against one another with the application of pressure and a relative oscillatory movement of the faces takes place to heat the joint area by a magnetostrictive transducer.

A method and a vibratory welding head for friction welding joining or deburring technical components with any contour of the surfaces to be welded has become known from European Patent Application No. EP 0 707 919 A1. According to the proposal, the friction welding head is equipped with a control eccentric and a parallel guide through which a rotational energy on the input side can be converted into a circular energy of motion guided in a parallel manner. According to the method, for the heating process a component is moved slightly by a vibratory welding head about the center of the fixed component in a friction connection.

A friction welding method is disclosed in GB 1 293 531 according to which in the heating step the faces of the rod ends placed against one another are moved in a relative orbital manner. This relative orbital movement can be circular, elliptical or in a different manner in a form of a Lissajous figure.

A method of friction welding railroad rails and similar beam profiles is known from German Patent Application No. DE 198 07 457 A1. According to the application, it is proposed to move an intermediate piece in linear or orbital oscillation between the rail ends to be joined, while parallel thereto the two fixed rail ends are pressed toward one another in the rail longitudinal direction against the intermediate piece in order to generate through friction energy the heat necessary for welding on both contact surfaces between respectively one rail end and respectively one sectional area of the intermediate piece. However, this type of joining of rails exhibits two friction welding joint surfaces due to the method.

For rails with great longitudinal extension, Austrian Patent No. AT 411 883 B discloses a method for the metallic joining of the face or cross-sectional surfaces by friction welding. After the ends are dressed perpendicular to the axes, it is provided for a heating step that the dressed cross-sectional areas are placed against one another, acted upon with pressure and the two rail ends are moved in an oscillating manner in an opposite direction relative to each other.

For a face connection of, where necessary, profiled rods by friction welding, according to the technical art for heating the face ends a relative movement by rotation about the rod axis is not exclusively necessary, relative movements of the pressurized cross-sectional areas, which are oscillating, where necessary orbitally oscillating, can also be used.

However, a metallic joining of rails and beams by friction welding with oscillating relative movements of the pressurized faces during heating can cause great forces for a movement of the rail ends and in particular a consequent displacement of the flange ends, that is a local discontinuity of the rail cross section, in the longitudinal direction at the weld point.

SUMMARY OF THE INVENTION

The invention overcomes the above-noted deficiencies, and provides a method of the type mentioned at the outset, which with reduced regulating forces for bending for the relative movement of the rail ends ensures an improved friction type for the development of energy at the faces and a high-quality metallic joining of the rails conformal in cross section.

According to the invention, the method includes moving, during the heating step, the rail ends in an oscillating manner relative to one another with a greatest oscillation amplitude perpendicular to the main axis direction with the maximum moment of inertia of the cross-sectional area.

Based on the teachings of engineering mechanics, according to which profiled rods subject to bending strain, such as rails, e.g., railroad rails or beams, seen respectively in cross section, have main axes for which the axial moment of inertia is a maximum or a minimum. In this manner, the cross-sectional surface areas and their respective normal distance from the axes are determined for the main moments of inertia. Investigations were carried out into the requirements and the effects of dynamic regulating forces during the friction of profiled surfaces.

For developing energy on the faces, the rail ends can be moved in any direction in an axially perpendicular oscillating manner.

Rails with a high bending resistance in the direction of principle stress consistently have projecting areas spaced as far as possible from the axis, such as rail base or beam flanges in order to achieve a high moment of inertia of the cross section, if necessary with a lower weight per length unit.

The investigations revealed that with a flat, orbital, concentric friction of the rail cross-sectional surfaces, during stress with a force component perpendicular to the projecting direction, projecting flanges are subjected to a primarily elastic bending, in the case of high oscillation amplitudes, sometimes also a plastic bending. Because deflections of the rail ends in the main axis direction with the maximum moment of inertia can now intensify these flange deflections, which as a result can lead to a so-called flange chatter and cause disadvantages of the metallic joint in terms of geometry and welding engineering, it is essential for the invention to align the greatest oscillation amplitude essentially perpendicular to the maximum moment of inertia of the cross-sectional surface.

It can be advantageous if the rail ends are moved during the heating step essentially in an oscillating manner relative to one another perpendicular to the main axis direction Y with the maximum moment of inertia of the cross-sectional surface.

With thicker flanges tapering conically towards the end, it can also be favorable if the rail ends are moved during the heating step essentially in an oscillating manner relative to one another perpendicular to the main axis direction Y, an oscillation with lower intensity in the direction of the main axis Y being superimposed on this movement. A low intensity of the oscillation, e.g., ¼ and less in the direction of the main axis can be conducive with respect to a release of friction heat over a uniform surface, but is limited by the geometric shape of the flange.

According to a further preferred embodiment of the method according to the present invention, during the heating step the rail ends are given a torsional movement relative to one another in an oscillating manner. By this type of movement the application of heat to the rail end areas intensified in a targeted manner with a high mass concentration can be achieved with low regulating forces.

It is advantageously also possible to achieve an oscillating relative movement of the rail ends over the entire surface of the rail cross section if a torsional oscillation is used with a rotation point outside the rail cross-sectional areas.

A high flexibility of the method with respect to different rail materials and to an optimization of the weld quality of the rod ends can be further achieved if during the heating step the rail ends are moved relative to one another in an essentially translatory oscillating manner perpendicular to the main axis direction Y, a torsional oscillation being superimposed on this movement.

If with the method according to the invention at least one of the rails is fixed such that its end part essentially meets the resonance conditions of a harmonic oscillation at least for a forced oscillatory motion, an essential reduction of the forces to be applied for the oscillatory motion can be achieved. Although the friction of the faces of the rail ends to produce the thermal energy acts in a damping manner on a resonance vibration, surprisingly with both a translatory and a torsional oscillation it was possible to achieve a reduction of the oscillation regulating forces if the fixing takes place with respect to the resonance conditions.

It is also possible to provide a relative movement of the rail faces during the heating step, whereby the oscillations result in superposition or Lissajous figures, which are embodied essentially filling the area and feature the greatest expansion perpendicular to the main axis direction Y with the maximum moment of inertia of the cross-sectional area. However, the weld quality is promoted only if the difference in the oscillation amplitude in the main axis directions is greater than 4 to 1, in particular 6 to 1. This connection was also found for superimposed translatory oscillations.

The present invention is directed to a method for the metallic joining of profiled rails in the longitudinal direction. The method includes heating rail ends to a joining temperature by pressing together faces of the rails end while simultaneously moving them relative to one another in an oscillating manner with a greatest oscillation amplitude relative to one another perpendicular to the main axis direction Y with the maximum moment of inertia of the cross-sectional surface, aligning the rail ends, and pressing the faces together to join the rails together.

In accordance with a feature of the present invention, the rails may include one of railroad rails or beams.

According to another feature of the invention, the rail ends can be aligned by aligning one of contours and cross-sections of the rails.

In accordance with another feature, the rails are joined together.

Further, during the heating, the method can include moving the rail ends relative to one another essentially in an oscillating manner perpendicular to the main axis direction Y with the maximum moment of inertia of the cross-sectional area.

Still further, during the heating, the method may include moving the rail ends essentially in an oscillating manner relative to one another perpendicular to the main axis direction Y, with an oscillation of lower intensity in the direction of the main axis Y being superimposed on this movement.

In accordance with still another feature of the instant invention, during the heating, the method can include providing a torsional movement on the rail ends relative to one another in an oscillating manner. A torsional oscillation may be used with a rotation point outside the rail cross-sectional areas.

According to a further feature of the invention, during the heating, the method may include moving the rail ends moved relative to one another in an essentially translatory oscillating manner perpendicular to the main axis direction Y, a torsional oscillation being superimposed on this movement.

Further, at least one of the rails is fixed such that its end part essentially meets the resonance conditions of a harmonic oscillation at least for a forced oscillatory motion. The oscillations may result in superposition or Lissajous figures, which are embodied essentially filling the area and feature the greatest expansion perpendicular to the main axis direction Y with the maximum moment of inertia of the cross-sectional area.

The invention is directed to a method of joining metallic profiled elements that includes generating a joining temperature in ends of the profiled elements by pressing the rail ends together and moving the rail ends relative to each other in an oscillating manner.

According to the invention, the rail ends have perpendicular axes centered at a center of gravity of the rail end having differing moments of inertia. Further, relative oscillatory movement may be greater in the direction of the axis having the lower moment of inertia. Moreover, relative oscillatory movement may be lower in the direction of the axis having the higher moment of inertia. Further still, the relative oscillatory movement in the direction of the axis having the higher moment of inertia is no more than % the oscillatory movement in the direction of the axis having the lower moment of inertia.

In accordance with a feature of the invention, relative oscillatory movement can be around a center of gravity of the rail end.

In accordance with still yet another feature of the present invention. Further, the rotational point may lie along an axis extending through a center of gravity of the rail ends.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 diagrammatically illustrates a railroad rail with final position of a face;

FIG. 1a illustrates motion vectors for the movement depicted in FIG. 1;

FIG. 2 diagrammatically illustrates a railroad rail with final position of a face with a torsional oscillation;

FIG. 2a illustrates motion vectors for the movement depicted in FIG. 2;

FIG. 3 diagrammatically illustrates a railroad rail with final position of a face with a torsional oscillation around a rotation point situated outside the cross-sectional area; and FIG. 3a illustrates motion vectors for the movement depicted in FIG. 3.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows diagrammatically a rail 1 which has a main axis direction Y with the maximum moment of inertia. A main axis X with the minimum moment of inertia runs perpendicular to the main axis direction Y through the center of gravity S of the rail cross-sectional area.

For the frictional heating of a face with a rail placed axially opposite, a rail 1 fixed at a distance is moved in an oscillating relative manner in the direction of the axis X according to the invention, whereby a largest displacement to one side (shown by a dotted line) is achieved in a position 1x.

FIG. 1a shows motion vectors based on the area center of gravity S. The oscillatory motion in the direction of the axis X, thus the main axis with the minimum moment of inertia of the rail cross-sectional area, is illustrated with the label Lx. A similar oscillatory motion, but much lower, preferably amounting to no more than ¼, preferably ⅛ of the value, in the Y direction, thus in the direction of the greatest moment of inertia, can be superimposed on an oscillatory motion X.

FIG. 2 shows a face of a rail 1, whereby a rail end performs an oscillating torsional movement around the centroid axis S relative to the axially opposite rail end to generate frictional heat. A relative face position 1r (shown by a dotted line) shows diagrammatically a largest torsional displacement of the oscillation, which is illustrated in FIG. 2a as a motion vector.

FIG. 3 shows in diagrammatic form a forced torsional oscillation during which the oscillation rotation point R lies on a main axis X with a minimum moment of inertia, but outside the rail centroid axis S or outside the rail face. With a highest torsional displacement, a relative face position 1r' is depicted diagrammatically. In this way, the motion vectors Ly, as illustrated in FIG. 3a, show an oscillation of the centroid axis in cross section around a rotation point R which has a spacing thereto.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for the metallic joining of profiled rails in the longitudinal direction, comprising:
   heating rail ends to a joining temperature by pressing together faces of the rails end while simultaneously moving them relative to one another in an oscillating manner with a greatest oscillation amplitude perpendicular to a main axis direction Y of a maximum moment of inertia of a cross-sectional surface;
   aligning the rail ends;
   pressing the faces together to join the rails together.

2. The method in accordance with claim 1, wherein the rails comprise one of railroad rails or beams.

3. The method in accordance with claim 1, wherein the rail ends are aligned by aligning one of contours and cross-sections of the rails.

4. The method in accordance with claim 1, wherein the rails are joined together.

5. The method in accordance with claim 1, wherein, during the heating, the method includes moving the rail ends relative to one another essentially in an oscillating manner perpendicular to the main axis direction Y with the maximum moment of inertia of the cross-sectional surface.

6. The method in accordance with claim 1, wherein, during the heating, the method includes moving the rail ends essentially in an oscillating manner relative to one another perpendicular to the main axis direction Y, with an oscillation of lower intensity in the direction of the main axis Y being superimposed on this movement.

7. The method in accordance with claim 1, wherein, during the heating, the method includes providing a torsional movement on the rail ends relative to one another in an oscillating manner.

8. The method in accordance with claim 7, wherein a torsional oscillation is used with a rotation point outside the rail cross-sectional areas.

9. The method in accordance with claim 1, wherein, during the heating, the method includes moving the rail ends moved relative to one another in an essentially translatory oscillating manner perpendicular to the main axis direction Y, a torsional oscillation being superimposed on this movement.

10. The method in accordance with claim 1, wherein at least one of the rails is fixed such that its end part essentially meets the resonance conditions of a harmonic oscillation at least for a forced oscillatory motion.

11. The method in accordance with claim 10, wherein the oscillations result in superposition or Lissajous figures, which are embodied essentially filling the area and feature the greatest expansion perpendicular to the main axis direction Y with the maximum moment of inertia of the cross-sectional surface.

12. A method of joining metallic profiled elements, comprising:

generating a joining temperature in ends of the profiled elements by pressing the rail ends together and moving the rail ends relative to each other in an oscillating manner, wherein the rail ends have perpendicular axes centered at a center of gravity of the rail end having differing moments of inertia, and wherein relative oscillatory movement is lower in the direction of the axis having the higher moment of inertia.

13. The method in accordance with claim 12, wherein the relative oscillatory movement in the direction of the axis having the higher moment of inertia is no more than ¼ the oscillatory movement in the direction of the axis having the lower moment of inertia.

14. The method in accordance with claim 12, wherein relative oscillatory movement is around a center of gravity of the rail end.

15. The method in accordance with claim 12, wherein relative oscillatory movement is around a rotational point located outside of the rail.

16. The method in accordance with claim 15, wherein the rotational point lies along an axis extending through a center of gravity of the rail ends.

* * * * *